Oct. 19, 1937.  B. E. O'HAGAN  2,096,404
SIGNALING SYSTEM
Filed Dec. 31, 1936  2 Sheets-Sheet 1

INVENTOR
Bernard E. O'Hagan.
BY
HIS ATTORNEY

Patented Oct. 19, 1937

2,096,404

UNITED STATES PATENT OFFICE 2,096,404

SIGNALING SYSTEM

Bernard E. O'Hagan, Swissvale, Pa., assignor to The Union Switch & Signal Company, Swissvale, Pa., a corporation of Pennsylvania Application December 31, 1936, Serial No. 118,608

16 Claims. (Cl. 246—34)

My invention relates to signaling systems, and particularly to signaling systems for governing the passage of vehicles along a trackway.

I will describe one form of apparatus embodying my invention, and will then point out the novel features thereof in claims.

A feature of my invention is the provision of apparatus for signaling a stretch of overlapping tracks, each of which tracks is constructed in a particular manner to cooperate with a particular construction of vehicle wheels, and by which apparatus the signals are effectively operated by a vehicle of any of the different wheel constructions as the vehicle moves through the stretch on the respective track. Another feature of my invention is the provision of apparatus for an intermittent control type of signaling system wherewith a vehicle or two or more vehicles coupled together are registered as they pass into a section of the track and are again registered as they pass out of said section by virtue of counting and comparing the number of pairs of wheels passing into and out of the section. Other features and advantages of my invention will appear as the specification progresses.

Figure 1:
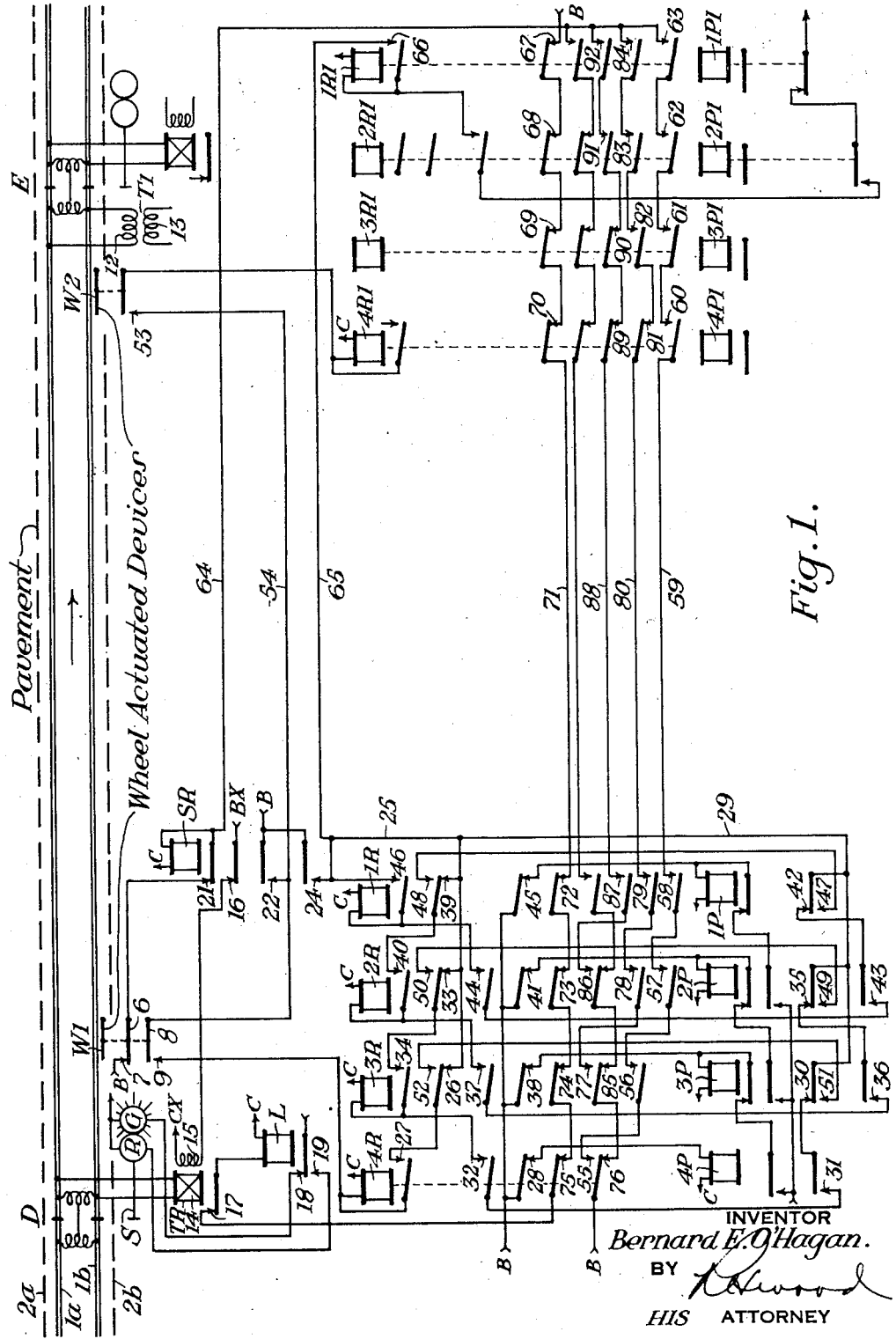
Figure 2:
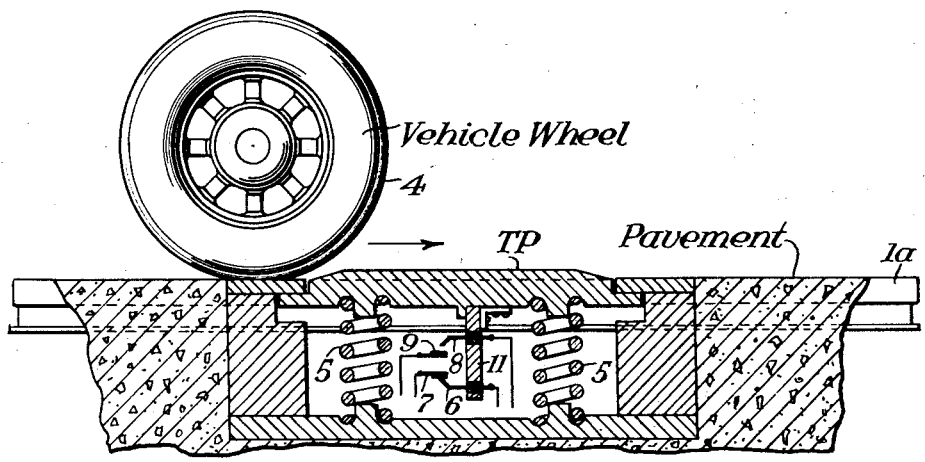
Figure 3:
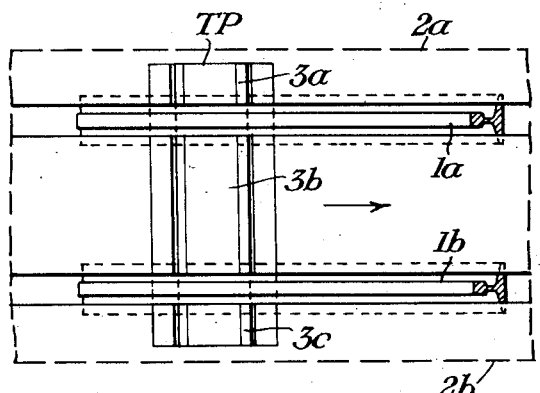

In the accompanying drawings, Fig. 1 is a diagrammatic view of one form of apparatus embodying my invention for a wayside signaling system for a stretch of two overlapping tracks, each of which tracks is constructed in a particular manner to cooperate with a vehicle of a particular wheel construction. For example, the stretch may be a subway or elevated structure which is provided with a steel rail track of the usual arrangement to cooperate with a flanged wheel vehicle, and with a concrete track or pavement to cooperate with a vehicle having a non-flanged wheel, such as a rubber tired wheel. Figs. 2 and 3 are diagrammatic views of a vehicle wheel actuated device that may be used with the apparatus of Fig. 1.

In each of the several views, like reference characters designate similar parts.

Although my invention is here disclosed as applied to a stretch of overlapping tracks comprising a standard steel rail track and a concrete or paved track, it is to be understood that I do not limit myself to this one particular application of the invention and other embodiments will suggest themselves. This one form of the invention will serve, however, as an illustration of the many places where the invention will be useful.

The counting relay chain and the control circuits therefor of the instant application are similar to the relay chain and associated control circuits set forth in the copending United States applications for Letters Patent, Serial No. 14,863, filed April 5, 1935, by Lloyd V. Lewis for Signaling systems; Serial No. 85,544, filed June 16, 1936, by Ralph Mordin for Remote control apparatus; and Serial No. 161,782, filed August 31, 1937, by George A. Culbertson for Signaling systems; which pending applications contain claims directed to such apparatus.

Referring to Fig. 1, a stretch of overlapping tracks is provided with two distinctive tracks, one of which comprises two steel rails $1a$ and $1b$, and the other of which tracks comprises a pavement laid outside and between the steel rails and which paved track is indicated on the drawings by the dotted lines $2a$ and $2b$. In this connection, the paved track is only a little wider than the standard gauge of the steel rail track and the top of the paved track is substantially level with the top of the steel rails. The steel rail track is adapted for cooperating with a flanged wheel, such, for example, as that provided for a trolley car. The paved track is adapted to cooperate with a non-flanged or rubber tired wheel, such as is used on trolley busses. It follows that vehicles of each of these two different classes may operate over this stretch of trackway, the normal direction of traffic being indicated on the drawings by an arrow. Furthermore, it is apparent that no two vehicles of whatever class of construction can pass each other within the stretch, since, as pointed out above, the paved track is only a little wider than the gauge of the steel rail track.

These two tracks are preferably arranged into sections. The steel rails $1a$ and $1b$ are divided into sections by the usual insulated rail joints, only one full section D—E being illustrated in the drawings for the sake of simplicity, and it will be understood that the steel rails of the stretch will be arranged into successive sections, each of which is similar to the section D—E. The paved track is arranged into sections by virtue of wheel actuated devices mounted at selected locations along the stretch. These wheel actuated devices are preferably located so that the sections of the paved track substantially coincide with the sections of the steel rail track. Thus, a wheel actuated device W1 is located in the pavement adjacent the entrance D of the section D—E, and a second wheel actuated device W2 is located in the pavement adjacent the exit of the section D—E. These two devices W1 and W2 are illustrated in Fig. 1 spaced apart from the insulated rail joints in the steel rails in order that there may be no confusion of the several parts. It will be understood that similar wheel actuated devices are located one at the entrance and one at the exit of each of the steel rail sections of the stretch so that the two tracks are each arranged into track sections that substantially coincide.

The wheel actuated devices W1 and W2 may take different forms, several of which are well known. One form of wheel actuated device that may be used is disclosed in Figs. 2 and 3. Looking at Fig. 3, a treadle plate TP is mounted in the pavement and is formed into three sections 3a, 3b, and 3c, the section 3a being located outside of the steel rail 1a, section 3b being located between the steel rails 1a and 1b, and section 3c being located outside of the rail 1b. These three sections of the treadle plate TP are each mounted in the pavement so that the top of the plate when depressed is substantially level with the top of the pavement. Looking at Fig. 2, when a vehicle wheel 4 rolls onto the left-hand end of the treadle plate TP, the plate is depressed against the force of biasing springs 5. The treadle plate TP operates a contact mechanism, the contact members 6 and 8 of which are operatively connected with the treadle plate TP through a rod 11, the arrangement being such that the treadle plate TP when depressed actuates the contact member 6 out of engagement with a stationary contact 7, and actuates the contact member 8 into engagement with a stationary contact 9. When the vehicle wheel 4 moves to the right and passes the treadle plate TP, the treadle plate is actuated by the springs 5 back to its normal position, that is, to the position illustrated in Fig. 2, and the contact mechanism is actuated to move contact member 6 into engagement with contact 7 and contact member 8 out of engagement with contact 9. The parts are so proportioned that the treadle plate TP is operated once for each pair of vehicle wheels, and is operated notwithstanding the fact that the wheels of the vehicle may be riding in part upon the steel rails, since the width of such wheels is greater than the width of the rails. It will also be understood that the contact mechanism operated by the wheel actuated device may be provided with any desired number of contact members and corresponding stationary contacts, and that the lead wires connected with such contact mechanism are carried away through the pavement in suitable housing. It follows that the contact mechanism of each wheel actuated device is actuated down and up once for each pair of vehicle wheels of a non-flanged wheel vehicle, but that the mechanism is not operated by the flanged wheels of a vehicle operating on the steel rails.

The section D—E of the steel rail track is provided with a track circuit which includes a source of current connected across the rails at one end of the section and a track relay connected across the rails at the other end of the section. In this instance, the source of current consists of a secondary winding 12 of a track transformer T1, the primary winding 13 of which is connected with any convenient source of alternating current such as a generator not shown. The track relay TR is a two-element alternating current relay, the winding 14 of which is connected across the rails of the section D—E, while the local winding 15 is connected with the BX and CX terminals of the source of alternating current over a front contact 16 of a relay SR to be referred to later.

Hence, under normal conditions, that is, when the rails of the section D—E are not shunted and the relay SR is picked up to close front contact 16, both windings 14 and 15 of the track relay TR are energized, and the relay TR is picked up, closing its front contact 17. When a flanged wheel vehicle occupies the section D—E to shunt the winding 14 of relay TR, or when a non-flanged wheel vehicle enters the section D—E to deenergize relay SR, in a manner to be fully described hereinafter, and deenergizes winding 15 of relay TR, the relay TR is released, opening front contact 17. The front contact 17 is interposed in the circuit of a control relay L to be described later.

Traffic through section D—E is governed by a wayside signal S located adjacent the entrance of the section. The type of wayside signal is immaterial and is here shown as a two-position color light signal capable of displaying a green light G to indicate clear traffic condition and displaying a red light R to indicate "stop". The green lamp G of signal S is governed over a simple operating circuit including a front contact 18 of the control relay L, and the circuit for the lamp R of signal S includes a back contact 19 of relay L. Consequently, when both tracks of the section D—E are unoccupied and track relay TR is picked up, the relay L is in turn picked up, causing the signal to display the green lamp G. When a vehicle on either of the tracks occupies the section D—E and the track relay TR is released, the relay L is also deenergized and the signal S displays the stop lamp R. In this connection, the energizing circuit for the control relay L is governed by apparatus other than the track relay TR, in a manner to be described hereinafter.

The intermittent control apparatus effected by a non-flanged wheel vehicle upon entering and leaving the section D—E, and by which apparatus the relay SR is governed, will now be described.

The relay SR is normally retained energized over a stick circuit that extends from the B terminal of any convenient source of current, such as a battery not shown, contact 6—7 of the wheel actuated device W1, front contact 21 and winding of relay SR, and to the C terminal of the same source of current. Thus, when the first pair of wheels of a non-flanged wheel vehicle enters section D—E and depresses device W1, the relay SR is deenergized, opening front contact 16, with the immediate result that relays TR and L are deenergized in turn. With the relay SR once deenergized, it is reenergized over a control circuit network governed by two counting relay chains, one relay chain being associated with the device W1 and the other relay chain being associated with the device W2.

These two relay chains are each effective to count the first and succeeding pairs of wheels passing over the associated wheel actuated device. The two relay chains are arranged so that, unless the wheel actuated device W2 at the exit end of the section is operated the same number of times the wheel actuated device W1 at the entrance of the section is operated, the stick relay SR remains deenergized. In other words, one counting relay chain registers the number of pairs of vehicle wheels entering the section D—E on the paved track, and the other relay chain counts the number of pairs of wheels leaving the section, the relay SR being energized, as will later appear, only when there is agreement between the two relay chains.

The counting relay chains may be any one of several well known types, and, as here shown, are of the type which leaves one relay energized over a stick circuit for each count, but deenergizes all the previously energized relays. The relay chain associated with the device W2 at the exit of section D—E is exactly the same as the relay chain associated with the device W1 at the entrance of the section, and it is thought that the description of the relay chain associated with the device W1 will suffice for an understanding of both. Consequently, for the sake of simplicity, only the relay windings and certain of the contact members of the relays of the chain at the exit end of the section are shown in Fig. 1.

The relay chain associated with the device W1 comprises a series of R relays, each of which is normally deenergized, and a series of corresponding repeater relays designated by the reference character P, and each of which is normally energized. In this instance, the series of R relays includes four relays 1R, 2R, 3R, and 4R and the series of repeater relays includes four relays 1P, 2P, 3P, and 4P. It will be understood, of course, that each series of relays of the chain may be extended to include any number of relays, as desired. Furthermore, it is believed that this relay chain can best be understood by describing the operation that follows the entry into the section D—E of a vehicle having four pairs of wheels, or two vehicles coupled together, each having two pairs of wheels.

When the device W1 is depressed by the first pair of wheels of the vehicle, the relay SR is deenergized and is released due to the opening of the contact 6—7 interposed in the stick circuit of that relay. With relay SR released, and while the device W1 is depressed closing contact 8—9, the relay 4R of the associated relay chain is provided with a pickup circuit that extends from the B battery terminal over back contact 22 of relay SR, contact 8—9 of device W1, winding of relay 4R, and to the C terminal, and relay 4R is energized. With relay 4R picked up, it is retained energized over a stick circuit subsequent to the device W1 being restored to its normal position by virtue of the first pair of wheels passing off the device. This stick circuit extends from the B terminal over back contact 24 of relay SR, wire 25, back contact 26 of relay 3R, front contact 27 and winding of relay 4R, and to the C terminal. Picking up of relay 4R, opening back contact 28, deenergizes the repeater relay 4P, and that relay is released. With relay 4P released, a pickup circuit is completed for the next relay 3R, and that relay is picked up. This pickup circuit for relay 3R includes B terminal, back contact 24 of relay SR, wires 25 and 29, front contact 30 of relay 3P, back contact 31 of relay 4P, front contact 32 of relay 4R, winding of relay 3R, and to the C battery terminal. Relay 3R on picking up completes a stick circuit by which it is retained energized, and which stick circuit includes back contact 24 of relay SR, wire 25, back contact 33 of relay 2R, front contact 34 and winding of relay 3R, and to the C terminal. Assuming that the first pair of wheels has passed off the device W1 and contact 8—9 is open, the relay 4R is now deenergized and released, since its stick circuit is open at the back contact 26 of relay 3R. Relay 4R, upon releasing, closing back contact 28, causes the relay 4P to be reenergized and picked up. Relay 3R, on picking up, opening back contact 38, causes the associated repeater relay 3P to be deenergized and released. A pickup circuit for the next relay 2R is now completed and that relay is picked up. This pickup circuit for relay 2R includes B terminal, back contact 24, wires 24 and 29, front contact 35 of relay 2P, back contact 36 of relay 3P, front contact 37 of relay 3R, winding of relay 2R, and to the C terminal. Relay 2R, on picking up, closes its stick circuit, which includes back contact 24, wire 25, back contact 39 of relay 1R and its own front contact 40. Relay 3R is now deenergized and released, since its stick circuit is open at the back contact 33 of relay 2R. With relay 3R down, closing back contact 38, the relay 3P is reenergized and picked up. Relay 2R, on picking up, opening back contact 41, removes current from relay 2P, and that relay is released. The pickup circuit for the next relay 1R is now completed, and that relay is picked up. The pickup circuit for relay 1R extends from B terminal over back contact 24, wires 25 and 29, front contact 42 of relay 1P, back contact 43 of relay 2P, front contact 44 of relay 2R, winding of relay 1R, and to the C terminal. Relay 1R, on picking up, completes its stick circuit, which includes back contact 24 of relay SR and its own front contact 46, and thus the relay 1R is retained energized until such time as the relay SR is reenergized to open back contact 24. Relay 2R is now without current and releases, since its stick circuit is open at the back contact 39 of relay 1R. Relay 2R, on releasing, closes back contact 41 and causes the relay 2P to be reenergized and picked up. Relay 1R, on picking up, opening back contact 45, removes current from the relay 1P, and that relay is released. It is to be seen, therefore, that operation of the wheel actuated device W1 by the first pair of vehicle wheels causes the successive operations of the relays 4R, 3R, 2R, and 1R, as well as the associated repeater relays, leaving the relay 1R energized and the associated repeater relay 1P deenergized, the remaining relays of the chain being returned to their normal positions, that is, the positions illustrated in Fig. 1. In other words, entry of the first pair of wheels of the vehicle into the section D—E is counted by virtue of relay 1R being energized and relay 1P being deenergized.

The second pair of vehicle wheels, upon depressing the device W1, closing contact 8—9, initiates a new operation of the associated relay chain. Closing of contact 8—9 completes the pickup circuit for the relay 4R, and which circuit includes the back contact 22 of relay SR and the closed position of contact 8—9. The picking up of relay 4R is followed by the successive operations of the relays of the chain in the manner described step by step, following the depressing of the device W1 by the first pair of wheels, and the description need not be repeated. This time, relay 2R, on picking up, finds a stick circuit prepared which extends from the B battery terminal over back contact 24 of relay SR, wires 25 and 29, back contact 47 of relay 1P, front contact 48 of relay 1R, front contact 40 and winding of relay 2R, and to the C terminal, with the result that further operation of the relay chain is stopped. That is to say, the second pair of vehicle wheels is counted in the relay chain, by virtue of the relay 2R being picked up and the relay 2P being released, the remaining relays ahead of these two relays being restored to their normal positions.

When the device W1 is actuated by the third pair of vehicle wheels and the contact 8—9 is again closed, a third operation of the relay chain is initiated. This time, the relay 3R, on picking up, finds a stick circuit prepared that extends from the B terminal over back contact 24, wires 25 and 29, back contact 49 of relay 2P, front contact 50 of relay 2R, front contact 34 and winding of relay 3R, and to the C terminal, with the result that the relay 3R is left energized and relay 3P is left released to count the third pair of vehicle wheels passing over the associated device W1.

Operation of the device W1 by the fourth pair of vehicle wheels to close contact 8—9 completes the pickup circuit for the relay 4R, and that relay is again picked up, opening back contact 28 and releasing relay 4P. This time, relay 4R finds a stick circuit prepared which extends from B terminal over back contact 24, wires 25 and 29, back contact 51 of relay 3P, front contact 52 of relay 3R, front contact 27 and winding of relay 4R, and to the C battery terminal, with the result that the fourth pair of vehicle wheels is counted by virtue of relay 4R being retained energized and relay 4P being released.

Since we have assumed that the vehicle entering the section D—E is constructed with four pairs of wheels, it is to be seen that the entry of the vehicle into the section is registered by the associated relay chain counting the four pairs of wheels.

When this vehicle advances through the section D—E and the first pair of wheels operates the device W2 located adjacent the exit of the section to close the contact 53 of that device, the closing of contact 53 completes a pickup circuit for the initial relay 4R1 of the relay chain located at the exit of the section, since the relay SR remains down during the time the vehicle is passing through the section. This pickup circuit may be traced from the B battery terminal over back contact 22 of relay SR, line wire 54, contact 53, winding of relay 4R1, and to the C battery terminal. This initial energization of the relay 4R1 is followed by the successive operations of the associated relays of the chain, with the resullt that the final relay 1R1 of the chain is retained energized over a stick circuit which includes battery terminal B, back contact 24 of relay SR, line wire 65, front contact 66 of relay 1R1, winding of the relay, and to the C battery terminal. The successive operations of the relays of this chain are exactly the same as described for the relay chain associated with the device W1 when device W1 was actuated by the first pair of wheels. It follows that the first pair of wheels of the vehicle as it leaves the section D—E is counted by the fact that the relay 1R1 is left energized and the relay 1P1 is left deenergized. Operation of the device W2 by the second pair of vehicle wheels initiates a second operation of the associated relay chain so that the second pair of wheels of the vehicle as it leaves the section is counted by the fact that the relay 2R1 is left energized and the relay 2P1 is left deenergized. Actuation of the device W2 by the third pair of vehicle wheels initiates a third operation of the relay chain, and this pair of wheels is counted by the fact that the relay 3R1 is left energized and the relay 3P1 deenergized in the associated relay chain. The relay 4R1 is retained energized and the relay 4P1 deenergized in response to the fourth actuation of the device W2 by the fourth pair of wheels. It is to be seen, therefore, that the relays 1R, 2R, 3R, and 4R of the relay chain located at the entrance of the section are left energized in response to entry of the vehicle of four pairs of wheels into the section, and the relays 1R1, 2R1, 3R1, and 4R1 of the chain located at the exit of the section are left energized in response to the vehicle leaving the section. In other words, agreement as to position is established between the relay chains in response to the vehicle in question passing through the section D—E on the paved track.

Under this condition of agreement between the two relay chains, one path of the control circuit network for the relay SR is completed, and that relay is reenergized. This path of the control circuit network may be traced from the B battery terminal over front contacts 55, 56, 57, and 58 of relays 4R, 3R, 2R, and 1R, respectively, line wire 59, front contacts 60, 61, 62, and 63 of relays 4R1, 3R1, 2R1, and 1R1, respectively, line wire 64, winding of relay SR, and to the C battery terminal. Relay SR, on being picked up, closing its front contact 21, is retained energized over its stick circuit which includes the normally closed contact 6—7 of the wheel actuated device W1. Relay SR, on picking up, closing front contact 16, reenergizes the local winding 15 of the track relay TR, and that relay is reenergized. Relay SR, on picking up to open back contact 24, removes current from each of the "R" relays of the two chains of relays, since the back contact 24 is common to all of the stick circuits by which these relays are held energized. As a result, the "R" relays of each of the two relay chains are deenergized and released to their normal positions. Release of the "R" relay series of each relay chain closes the energizing circuit for the associated series of "P" relays, and these repeater relays are again reenergized. When the two series of "R" relays of the two chains of relays are released, the energizing circuit for the control relay L is completed, and that relay is picked up to reestablish the circuit for the G lamp of the signal S. This energizing circuit for relay L includes battery terminal B, back contacts 67, 68, 69, and 70 of relays 1R1, 2R1, 3R1 and 4R1, respectively, line wire 71, back contacts 72, 73, 74, and 75 of relays 1R, 2R, 3R, and 4R, respectively, thence over front contact 17 of track relay TR, winding of relay L and to the C battery terminal.

In case a vehicle of three pairs of wheels enters the section D—E on the paved track, the device W1 is actuated three times, and these three pairs of wheels are counted by the associated relay chain by the fact that the relays 1R, 2R, and 3R are left energized and the relay 4R deenergized. The operation of the relay chain in response to the three successive actuations of the device W1 is exactly the same as described in connection with the first three pairs of wheels for the vehicle having four pairs of wheels, and the operation need not be repeated. When this vehicle on the paved track vacates the section D—E, the three pairs of wheels will successively actuate the device W2 to cause three successive operations of the associated relay chain, with the result that the three pairs of wheels are counted by the fact that the relays 1R1, 2R1, and 3R1 of the associated relay chain are left energized, and the relay 4R1 is deenergized. Under this condition of agreement between the two relay chains, a second branch path for the control circuit network for the relay SR is completed, and which branch path includes back contact 76 of relay 4R, front contacts 77, 78, and 79 of relays 3R, 2R and 1R, respectively, line wire 80, back contact 81 of relay 4R1, front contacts 82, 83, and 84 of relays 3RI, 2RI, and IRI, respectively, and thence as previously traced. With relay SR picked up, the apparatus is restored to its normal position in the manner described hereinbefore, and the G lamp is illuminated to display the clear indication.

Again, in the event a vehicle of two pairs of wheels enters the section D—E on the paved track and actuates the device WI two times, the two pairs of vehicle wheels are counted by the relay chain associated with device WI by the fact that relays IR and 2R are picked up and relays 3R and 4R are left released. As this vehicle vacates the section and actuates the device W2 two successive times, the two pairs of vehicle wheels are counted by the relay chain associated with device W2 by the fact that relays IRI and 2RI are picked up and the relays 3RI and 4RI are left released. Under this condition of agreement between the two relay chains, a third branch path in the control circuit network for relay SR is completed to reenergize that relay. This third branch path includes back contacts 76 and 85 of relays 4R and 3R, respectively, front contacts 86 and 87 of relays 2R and IR, respectively, line wire 88, back contacts 89 and 90, relays 4RI and 3RI, respectively, front contacts 91 and 92 of relays 2RI and IRI, respectively, and thence as previously traced.

An analysis of the apparatus of Fig. 1 discloses that, if the device WI is actuated by a single pair of vehicle wheels and only the relay IR of the associated relay chain is picked up, then actuation of the device W2 by a single pair of wheels to pick up only the relay IRI of the relay chain associated with device W2 establishes agreement between the two relay chains, and a fourth path in the control circuit network for the relay SR is completed and the apparatus is restored to its normal position.

A vehicle entering section D—E on a steel rail track shunts the winding 14 of track relay TR and the track relay TR, upon releasing deenergizes relay L, which relay in turn is released and the signal S set to indicate "stop". When this vehicle operating on the steel rail track vacates the section, the winding 14 is reenergized and the track relay is picked up, with the result that the control relay L is reenergized and is picked up to operate the signal S to the clear position. This vehicle operating on the steel rail track does not actuate either of the devices WI or W2, and hence the relay chains remain inactive during the passage of this vehicle through the section D—E.

When a vehicle enters the section D—E on the paved track the device WI is actuated and the relay SR is deenergized, and that relay, upon releasing, deenergizes the winding 15 of the track relay TR, with the result that the control relay L is released and the signal is set to indicate "stop". As this vehicle on the paved track moves through the section and operates the wheel actuated devices WI and W2, the relay chains are operated, in a manner described hereinbefore, to register the passage of the vehicle through the section. With agreement established between the two relay chains, the relay SR is reenergized subsequent to the vehicle on the paved track vacating the section, with the result that the signal S is operated to the clear position. The energizing circuit for the control relay L being carried over back contacts of the several relays of the two relay chains, the initial positions of the relay chains are checked before the signal S is cleared. It follows that the signal S is effectively operated in response to a vehicle on either the steel rail track or on the paved track passing through the section D—E.

Although I have described only one form of apparatus embodying my invention, it is understood that various changes and modifications may be made therein within the scope of the appended claims without departing from the spirit and scope of my invention.

Having thus described my invention, what I claim is:

1. A signaling system comprising a stretch of overlapping tracks different in construction for passage of a plurality of vehicles of differently constructed wheels one track construction for each vehicle wheel construction, said vehicles normally moving through said stretch in a given direction, a signal, wayside apparatus partly associated with each of said tracks and responsive to entry of a vehicle into the stretch on any one of the tracks, and means governed by said wayside apparatus for operating the signal.

2. A signaling system comprising a stretch of overlapping tracks different in construction for passage of a plurality of vehicles of differently constructed wheels one track construction for each vehicle wheel construction, said vehicles normally moving through said stretch in a given direction, a signal to govern the movement of the vehicles through the stretch, wayside means associated with said stretch and responsive to entry of a vehicle on any track into the stretch, and means governed by said wayside means for operating the signal.

3. A signaling system comprising a stretch of overlapping tracks different in construction for passage of a plurality of vehicles of differently constructed wheels one track construction for each vehicle wheel construction, said vehicles normally moving through said stretch in a given direction, a signal to govern the movement of the vehicles through the stretch, wayside means associated with said stretch and responsive to entry of a vehicle on any track into the stretch and to the vehicle vacating the stretch, and means governed by said wayside means for operating the signal.

4. A signaling system comprising a stretch of overlapping tracks different in construction for passage of a plurality of vehicles of differently constructed wheels one track construction for each vehicle wheel construction, said stretch formed into a section of given length through which the vehicles normally move in a given direction, a signal to govern the passage of the vehicles through said section, wayside means associated with said section and responsive to entry of a vehicle on any track into the section and to the vehicle vacating the section, and means governed by said wayside means for operating the signal.

5. A signaling system comprising a stretch of overlapping tracks consisting of a steel rail track and a pavement track for passage of a flanged wheel vehicle and a vehicle having a non-flanged wheel respectively, said vehicles normally moving through said stretch in a given direction, a signal to govern the movement of the vehicles through the stretch, wayside circuit means formed partly by the steel rails and partly by a wheel actuated device mounted in the pavement, said wayside circuit means effectively operated in response to entry of a vehicle on either of said tracks into the stretch, and means governed by said wayside circuit means for operating the signal.

6. A signaling system comprising a stretch of overlapping tracks consisting of a steel rail track and a pavement track for passage of a flanged wheel vehicle and a vehicle having a non-flanged wheel respectively, said stretch divided into a section through which the vehicles normally move in a given direction, a signal to govern the movement of the vehicles through said section, a first track circuit including the steel rails of the section, a second track circuit including a wheel actuated device mounted in the pavement of the section, and circuit means controlled jointly by said first and second track circuits for governing the operation of said signal.

7. A signaling system comprising a stretch of overlapping tracks consisting of a steel rail track and a pavement track for passage of a flanged wheel vehicle and a vehicle having a non-flanged wheel respectively, said stretch divided into a section through which the vehicles normally move in a given direction, a signal to govern the movement of the vehicles through said section, a relay, a first track circuit means including the steel rails of the section and a winding of said relay as well as a current source, a second track circuit means including a wheel actuated device mounted in the pavement adjacent the entrance of the section and another winding of said relay as well as a current source, whereby said relay is operated in response to entry of a vehicle into the section on either of said tracks, and means governed by said relay for operating the signal.

8. A signaling system comprising a stretch of overlapping tracks consisting of a steel rail track and a pavement track for passage of a flanged wheel vehicle and a vehicle having a non-flanged wheel respectively, said stretch divided into a section through which the vehicles normally move in a given direction, a signal to govern the movement of the vehicles through said section, two wheel actuated devices one mounted in the pavement adjacent the entrance of said section and the other mounted in the pavement adjacent the exit of the section, a first track circuit including the steel rails of the section and a winding of a track relay as well as a current source, a second track circuit means including each of said devices and a winding of another relay as well as a current source, and means controlled jointly by said track relay and said other relay for operating the signal.

9. A signaling system comprising a stretch of overlapping tracks consisting of a steel rail track and a pavement track for passage of a flanged wheel vehicle and a vehicle having a non-flanged wheel respectively, said stretch divided into a section through which the vehicles normally move in a given direction, a signal to govern the movement of the vehicles through said section, a first wheel actuated device mounted in the pavement adjacent the entrance of the section and a second wheel actuated device mounted in the pavement adjacent the exit of the section, said devices each effectively actuated once for each pair of wheels of a passing non-flanged wheel vehicle, a chain of relays associated with each of said devices for successive operation of the relays of the chain in response to successive actuation of the associated device, a track circuit including the steel rails and a winding of a track relay, another relay, circuit means controlled jointly by the two chains of relays for governing said other relay and effective to energize the relay only when the two chains of relays are in agreement, and means controlled jointly by the track relay and said other relay for operating the signal and effective to clear the signal only when the track relay and said other relay are both energized.

10. A signaling system comprising a stretch of overlapping tracks consisting of a steel rail track and a pavement track for passage of a flanged wheel vehicle and a vehicle having a non-flanged wheel respectively, said stretch divided into a section through which the vehicles normally move in a given direction, a signal to govern the movement of the vehicles through said section, a first wheel actuated device mounted in the pavement adjacent the entrance of the section and a second wheel actuated device mounted in the pavement adjacent the exit of the section, said devices each effectively actuated once for each pair of wheels of a passing non-flanged wheel vehicle, counting means associated with each of said devices and effectively operated once for each actuation of the associated device, a track circuit including the steel rails and a winding of a track relay, another relay, circuit means controlled jointly by said two counting means for governing said other relay and effective to energize the relay only when the two counting means are in agreement, and means controlled jointly by the track relay and said other relay for operating the signal and effective to clear the signal only when the track relay and said other relay are both energized.

11. A signaling system comprising a trackway over which traffic normally moves in one direction and which is formed into two distinctive overlapping tracks one track adapted for the particular wheel construction of one vehicle and the other track adapted for the particular wheel construction of a second vehicle, said tracks each divided into a section and which two sections have substantially the same limits, a signal located in said trackway adjacent the entrance of said section to govern traffic therethrough, a vehicle actuated means associated with each track and effectively operated in response to a vehicle entering the section of the associated track, and means controlled jointly by the two vehicle actuated means for operating the signal.

12. A signaling system comprising a section of trackway over which vehicles normally move in a given direction, vehicle wheel actuated devices one located at each end of the section, said devices adapted to be actuated once for each pair of vehicle wheels passing the device, counting means one associated with each of said devices and operated once each time the associated device is actuated to register the number of pairs of vehicle wheels passing the device, control means governed by the two counting means and effectively operated only when the two counting means agree in the registered number of wheels, a signal, and circuit means governed by the control means when operated for operating said signal.

13. A signaling system comprising a section of trackway over which vehicles normally move in a given direction, vehicle wheel actuated devices one located at each end of the section, said devices adapted to be actuated once for each pair of vehicle wheels passing the device, counting means one associated with each of said devices and operated once each time the associated device is actuated to register the number of pairs of vehicle wheels passing the device, control means governed by the two counting means and effectively operated only when the two counting means agree in the registered number of wheels, and other circuit means governed by the control means when operated for restoring said counting means each to an initial position.

14. A signaling system comprising a section of trackway over which vehicles normally move in a given direction, vehicle wheel actuated devices one located at each end of the section, said devices adapted to be actuated once for each pair of vehicle wheels passing the device, counting means one associated with each of said devices and operated once each time the associated device is actuated to register the number of pairs of vehicle wheels passing the device, control means governed by the two counting means and effectively operated only when the two counting means agree in the registered number of wheels, a signal located adjacent the entrance of said section for governing the movement of vehicles through the section, and circuit means governed by the control means when operated for clearing the signal.

15. A signaling system comprising a section of trackway over which vehicles normally move in a given direction, vehicle wheel actuated devices one located at each end of the section, said devices adapted to be actuated once for each pair of vehicle wheels passing the device, counting means one associated with each of said devices and operated once each time the associated device is actuated to register the number of pairs of vehicle wheels passing the device, control means governed by the two counting means and effectively operated only when the two counting means agree in the registered number of wheels, a signal located adjacent the entrance of the section to govern the movement of vehicles through the section, a first circuit means governed by the control means when operated for clearing the signal, a second circuit means governed by the control means when operated to restore said counting means each to its initial position, and means governed by said counting means to prevent clearing of the signal by said first circuit means unless the counting means are both restored to their initial positions.

16. A signaling system comprising a section of trackway and a vehicle adapted to travel thereon, said vehicle normally operating in a given direction, vehicle actuated devices one at each end of the section, said devices adapted to be actuated once for each pair of wheels of the vehicle passing, counting means one associated with each device and operated once each time the associated device is actuated to register the number of pairs of wheels of the vehicle passing that device, control means governed jointly by the two counting means and operated when the counting means associated with the device at the exit end of the section has been actuated an equal number of times as the counting means associated with the device at the entrance end of the section, circuit means controlled by said control means when operated to restore both counting means to their initial positions, and an indicating device governed jointly by said counting means.

BERNARD E. O'HAGAN.